(12) United States Patent
Brent

(10) Patent No.: US 6,590,876 B1
(45) Date of Patent: Jul. 8, 2003

(54) DIRECT PATH MATRIX COMMUNICATION SYSTEM AND METHOD

(75) Inventor: Kenneth Wayne Brent, Miami, FL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/170,395

(22) Filed: Oct. 13, 1998

(51) Int. Cl.[7] .......................... H04L 12/64; H04Q 7/20
(52) U.S. Cl. ................................. 370/329; 370/466
(58) Field of Search ................................ 370/329, 330, 370/465, 466, 469, 470

(56) References Cited

U.S. PATENT DOCUMENTS 5,513,181 A * 4/1996 Bresalier et al. ............ 370/465
6,178,170 B1 * 1/2001 Duree et al. ............ 370/395.61
6,278,697 B1 * 8/2001 Brody et al. ................. 370/310

* cited by examiner

*Primary Examiner*—Melvin Marcelo

(57) ABSTRACT

A system and method for directly converting encoded speech-frames in a communication system which has a transmitting unit that transmits an input signal of an input modulation type, a receiving unit that receives an output signal of an output modulation type and a direct interface system that directly interfaces the input signal to the output signal.

42 Claims, 6 Drawing Sheets

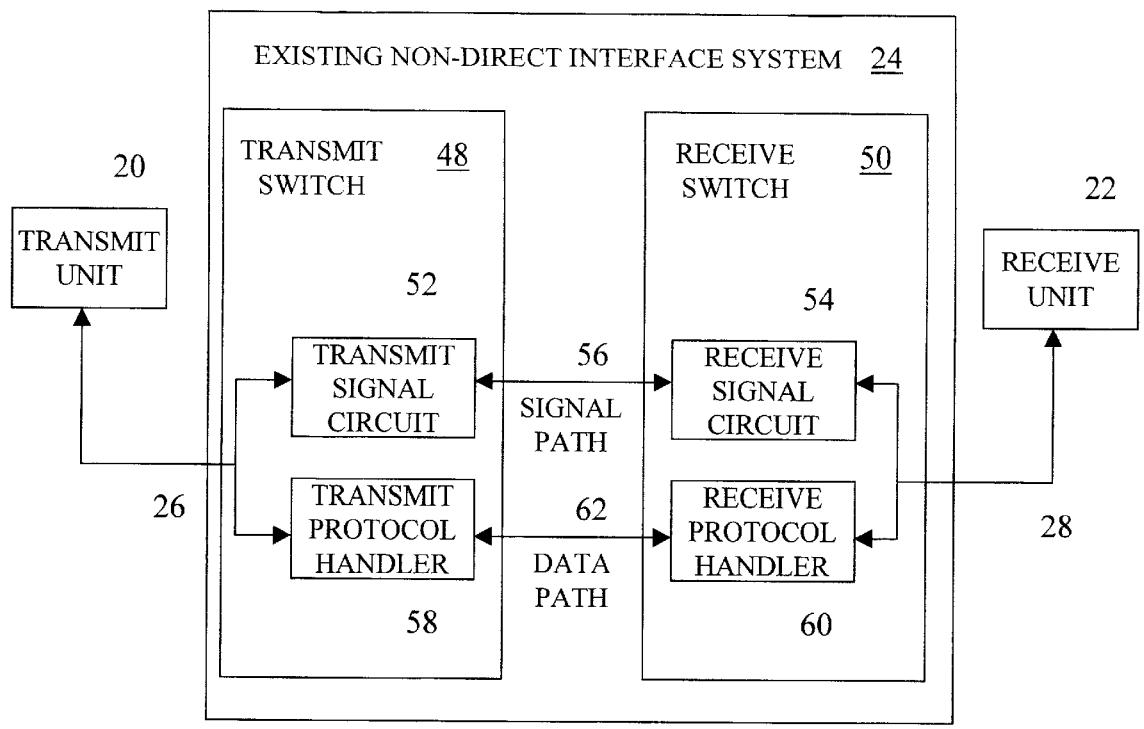
FIG. 4 - PRIOR ART
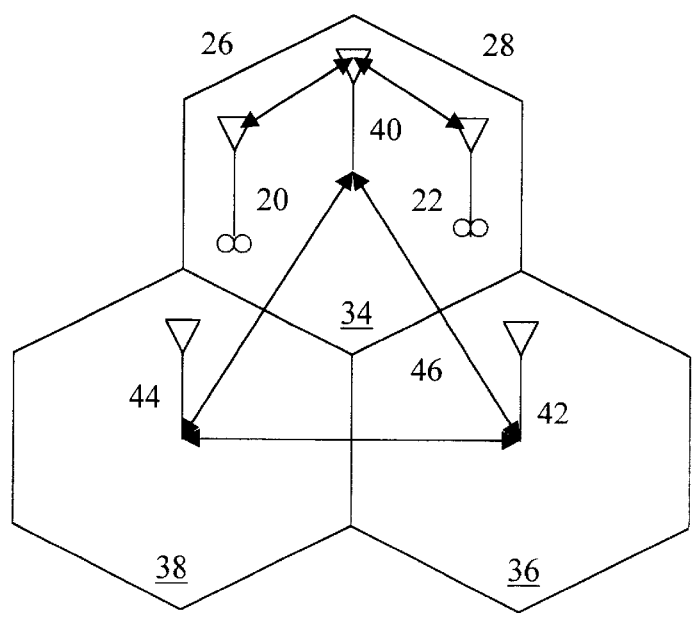
FIG. 5 - PRIOR ART

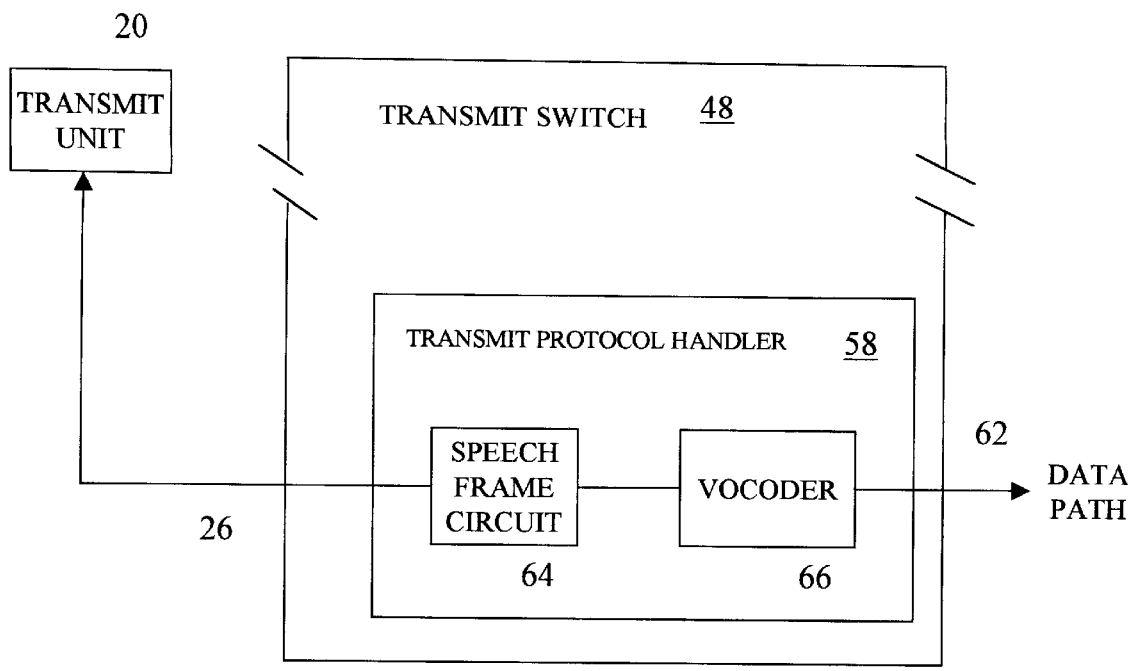
FIG. 6 - PRIOR ART
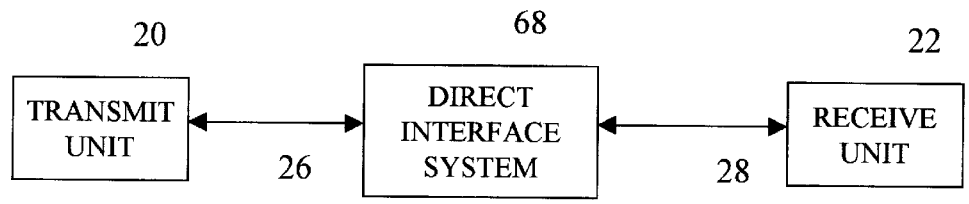
FIG. 7

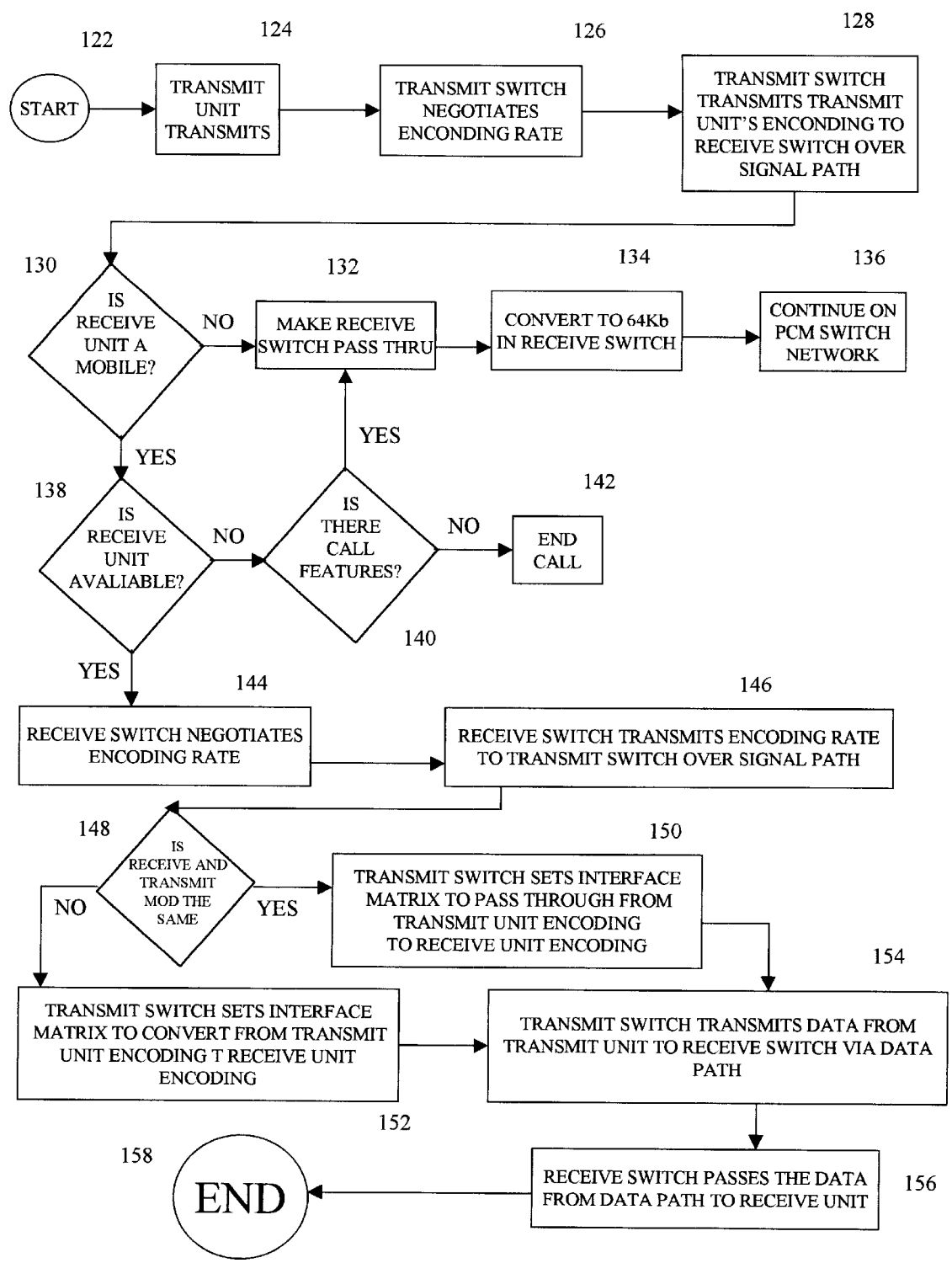

DIRECT PATH MATRIX COMMUNICATION SYSTEM AND METHOD

BACKGROUND OF THE INVENTION

The present invention relates generally to the field of communication systems and more particularly to wireless communication systems.

As wireless communication systems such as cellular telephones networks have become more common, the emphasis in wireless communication systems is to provide feature rich services in a mobile (wireless or cellular) environment. The mobile-to-mobile calling patterns are expected to increase exponentially as more subscribers are added to wireless services.

This produces a need for a network infrastructure in existing communication systems that supports both the existing connectivity paths and those new connectivity paths required to support a substantially higher mobile-to-mobile traffic percentage. Presently, wireless network infrastructures have an inherent need to convert between the radio frequency (RF) modulated encoded speech frames of a transmitting mobile unit (transmit unit), such as a cellular telephone, and the 64 kilobit per second (64 kb) pulse code modulation (PCM) based telephony infrastructure of existing switching equipment. In order to complete the mobile-to-mobile connection, the exact process occurs in the reverse direction requiring the conversion of 64 kb PCM into RF encoded speech-frames for the receiving mobile unit (receive unit). This conversion occurs multiple times in a mobile-to-mobile call scenario. Thus, conversion delay is introduced into the end-to-end path (transmit unit to receive unit) and quantization noise is increased to level that are highly noticeable to the mobile users.

Additionally, new hardware is required because the wireless infrastructure requires additional trunk resources to connect both ends of the mobile-to-mobile call. Thus, a need exists for network infrastructures that support existing connectivity paths and provide new connectivity paths to support a higher mobile-to-mobile traffic percentage.

SUMMARY OF THE INVENTION

In accordance with the present invention, the problem of multiply converting the RF modulated encoded speech-frames, received from the transmit unit, into an intermediate 64 kb PCM and then back to RF modulated encoded speech-frames for transmission to the receive unit is overcome by using an interface circuit that is programmable and has a matrix component that allows similar encoded speech-frame streams to cross-connect and differently encoded speech-frame streams to be cross-converted without any intermediate steps.

An example system of the invention includes a transmit unit that transmits an input signal of an input modulation encoded speech-frame type, a receive unit that receives an output signal of an output modulation encoded speech-frame type and a direct interface system that directly interfaces the input signal to the output signal.

The direct interface system includes a transmit interface circuit that directly interfaces the input signal to a data-path signal and a receive interface circuit that directly interfaces the data path signal to the output signal.

The transmit interface circuit includes both a plurality of input modulation encoded speech-frame types and a plurality of output modulation encoded speech-frame types. One of the input modulation encoded speech-frame types represents the encoded speech-frame type of input signal and one of the output modulation encoded speech-frame types represents the encoded speech-frame type of output signal. Additionally, the transmit interface circuit include an interface matrix that directly interfaces the encoded speech-frame type of the input signal to the encoded speech-frame type of the output signal.

BRIEF DESCRIPTION OF THE DRAWINGS

The foregoing advantageous features of the invention will be described in detail and other advantageous features will be made apparent upon reading the following detailed description that is given with reference to the several figures of the drawings, in which:

FIG. 4 is another functional block diagram showing a prior art existing non-direct interface system functional block of FIG. 1;

FIG. 5 is a graphical representation of three cell sites within the mobile telecommunication system of FIG. 1 where the transmit and receive units are located in the same cell;

FIG. 6 is another functional block diagram showing a prior art transmit protocol-handler function block of FIG. 4;

FIG. 7 is a function block diagram of the system of the invention;

FIG. 10 is a logic flow chart that shows the preferred process steps preformed by the system of FIG. 7.

DETAILED DESCRIPTION

Figure 1:
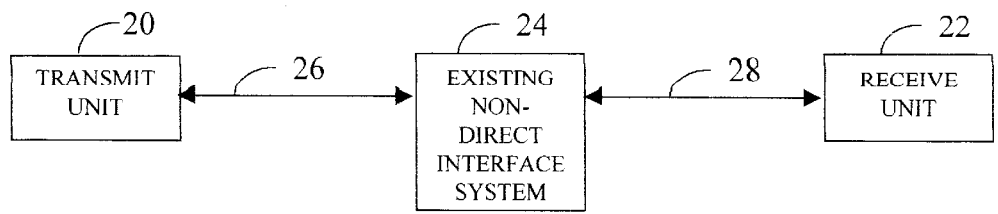
FIG. 1 is a functional block diagram of a prior art telecommunication system.

Referring to FIG. 1, an existing telecommunication system is shown. A transmit unit 20 sends and receives communication data (such as voice, digital data, and facsimile) to a receive unit 22 through an existing non-direct interface system 24. The system allows two way communication between the transmit unit 20 and the receive unit 22 by working identically in both directions. In one direction, the transmit unit 20 sends communication data via an input signal 26 to the existing non-direct interface system 24 which processes and routes the data via an output signal 28 to the receive unit 22. In the other direction, the receive unit 22 sends communication data via the output signal 28 to the existing non-direct interface system 24 which processes and routes the data via the input signal 26 to a transmit unit 20.

The transmit unit 20 and receive unit 22 are either mobile terminals (also known as mobile stations), such as cellular telephones or radio units, or non-mobile terminals such as conventional land-line telephones.

Figure 2:
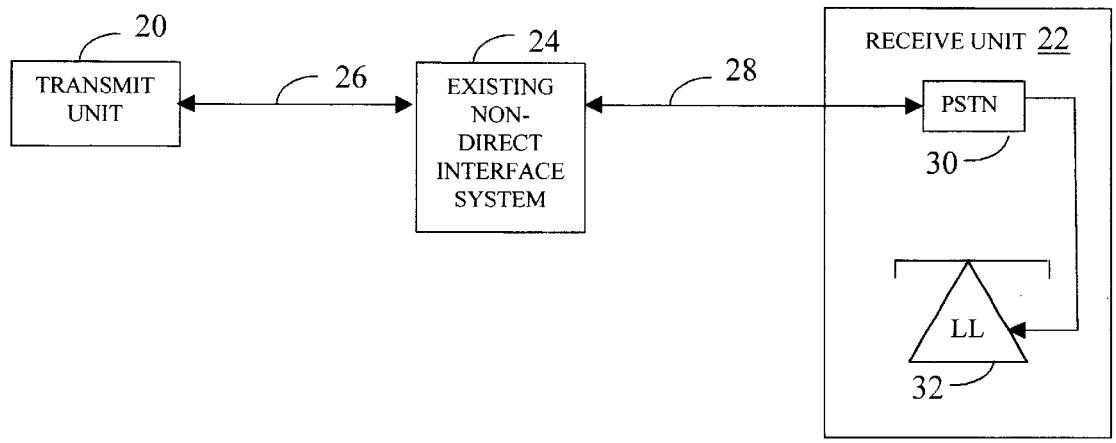
FIG. 2 is another function block diagram of the prior art telecommunication system in FIG. 1 showing a transmit (mobile) unit to land-line communication.

In FIG. 2, the transmit unit 20 is shown to be a mobile terminal and the receive unit 22 is shown as a conventional land line telephone. In one direction, the transmit unit 20 transmits communication data via the input signal 26 to the existing non-direct interface system 24 which processes and routes the data via the output data 28 to the receive unit 22. At the receive unit 22, the output data 28 is transmitted to a land-line telephone 32 via a private switch telephone network 30. In the other direction, the land-line telephone 32 transmits communication data via the output signal 28 and private switched telephone network 30 to the existing non-direct interface system 24 which processes and routes the data via the input data 26 to the receive unit 20.

In this example, the transmit unit 20 transmits and receives communication data to the existing non-direct interface system 24 via radio waves, while the land-line telephone 32 transmits and receives communication data via a direct non-radio fashion. The transmit unit 20 transmits a RF input signal 26 with varying types of encoded speech-frame modulation types based on the requirements of the communication system. The land-line telephone typically uses 64 kb PCM based on the telephony infrastructure of existing switching equipment.

Figure 3:
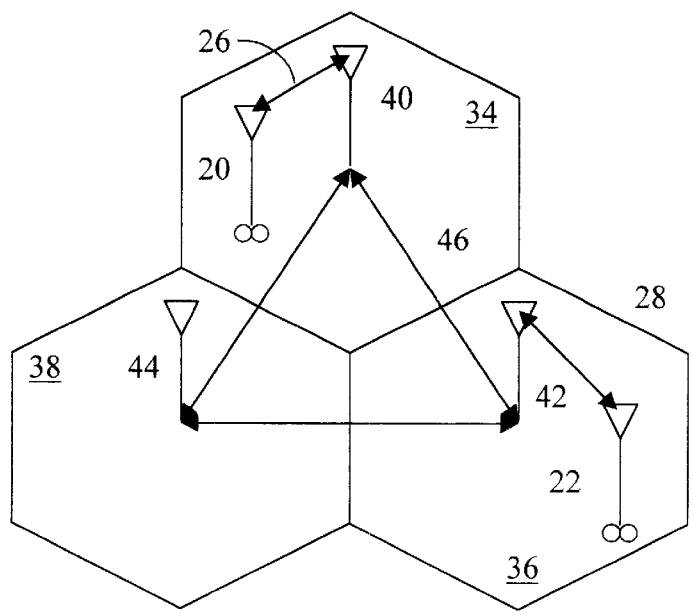
FIG. 3 is a graphical representation of three cell sites within the mobile telecommunication system of FIG. 1 where the transmit and receive units are located in different cells.

In FIG. 3, the transmit unit 20 and the receive unit 22 are shown as mobile terminals within the current mobile telecommunication system consisting of a plurality of cells 34, 36 and 38. Consistent with convention, each cell 34, 36 and 38 is shown having a hexagonal cell boundary. Within each cell 34, 36 and 38 are base stations 40, 42 and 44 that are located near the center of the corresponding cell 34, 36 and 38. Specifically, the base station 40 is located within cell 34, base station 42 is located within cell 36, and base station 44 is located within cell 38. The base stations 40, 42 and 44 are part of the existing non-direct interface system 24 and transmit and receive communication data to each other via a data path 46.

As an example, the transmit unit 20 is located within cell 34 and the receive unit 22 is located with cell 36. Base stations 40, 42 and 44 transmit and receive communication data with any mobile terminal located within their respective cells. The transmit unit 20 communicates with the base station 40 via the RF input data signal 26 inside cell 34 and the receive unit 22 communicates with the base station 42 via the RF output data signal 28 inside of cell 36.

FIG. 4 is a functional block diagram for the existing non-direct interface system 24 of FIG. 1. The existing non-direct interface system 24 contains numerous telecommunication switches corresponding to the different base stations for the different cells in the telecommunication system. As an example, the existing non-direct interface system 24 is shown to have at least two switches because the two mobile terminals corresponding to the transmit unit 20, in cell 34 in FIG. 3, and the receive unit 22, in cell 36 in FIG. 3, are in different cells. The first switch (transmit switch 48) corresponds to the base station 40 in FIG. 3 and the second switch (receive switch 50) corresponds to the base station 42 in FIG. 3.

The transmit switch 48 contains a transmit signal circuit 52 and a transmit protocol handler 58. The receive switch 50 contains a receive signal circuit 54 and receive protocol handler 60. The transmit unit 20 communicates with the receive unit 22 through the combination of the transmit switch 48 and receive switch 50.

The transmit unit 20 attempts to communicate with receive unit 22 by transmitting the input signal 26 to the transmit switch 48. The input signal 26 is of a given RF modulation encoded speech-frame type. When the input signal 26 is received by the transmit switch 48, the transmit switch 48 determines the encoded speech-frame type of the input signal 26 and sets the transmit protocol handler 58 to convert the encoded speech-frame type of the input signal 26 to a standard 64 kb PCM type for the data path 62. The transmit switch 48, with a transmit signal circuit 52, also determines from the input data 26 an identification request from the transmit unit 20. The identification request is a request from the transmit unit 20 to the transmit switch 48 to communicate with the receive unit 22. The identification request contains identifying information for the receive unit 22 such as the cellular telephone number.

The transmit signal circuit 52 sends the identification request via a signal path 56 to a receive signal circuit 54 in the receive switch 50. When the receive signal circuit 54 receives the identification request, the receive signal circuit 54 attempts to establish a connection with the receive unit 22. If the receive unit 22 fails to respond, the receive signal circuit 54 returns a unit not responding message via the signal path 56 to the transmit signal circuit 52 which forwards the message to the transmit unit 20 and stops communication.

If the receive unit 22 does respond, the receive signal circuit 54 determines the receive unit's 22 encoded speech-frame type and the receive protocol handler 60 corresponding adjusts itself to convert the 64 kb PCM data path 62 to the encoded speech-frame type of the receive unit 22. The receive signal circuit 54 then sends a message via the signal path 56 to the transmit signal circuit 52 to start communication. The transmit protocol handler 58 then converts the transmit unit 20 encoded speech-frame type input signal 26 to the 64 kb PCM data path signal 62 and sends it to the receive protocol handler 60 which converts the 64 kb PCM data signal 62 to the receive unit's 22 encoded speech-frame output signal 28. The receive switch 50 then transmits the output signal 28 to the receive unit 22.

Communication in the opposite direction from the receive unit 22 to the transmit unit 20 is identical because the existing non-direct interface system 24 is a complete two way communication system. The transmit switch 48 and the receive switch 50 operate in the same way.

FIG. 5 shows the situation when the transmit unit 20 and the receive unit 22 are mobile terminals in the same cell 34. In this case both the transmit unit 20 and the receive unit 22 communicate with only the base station 40. There is only one switch involved in the communication path between the transmit unit 20 and the receive unit 22.

Thus in FIG. 4, the transmit switch 48 and the receive switch 50 are the same switch and the signal path 56 and the data path 62 travel in a loop. The operation of the existing non-direct interface system 24 is the same as in the case of the mobile terminals being in different cells because the transmit switch 48 has the capability of communicating with multiple transmit terminals and operating as both the transmit switch 48 and the receive switch 50.

In FIG. 6 a speech frame circuit 64 and a voice encoder 66 (vocoder) are shown within the transmit protocol handler 58. The speech frame circuit 64 determines the encoded speech-frame type for the input signal 26 and the vocoder 66 contains speech encoders that translate between the encoded-speech frames for transport across the RF environment, such as the input signal 26, to the 64 Kb PCM used for the data path 62. The receive protocol handler 60 operates in the same way as the transmit protocol handler 58.

FIG. 7 shows a new telecommunication system incorporating the invention. The transmit unit 20 sends and receives communication data to a receive unit 22 through a direct interface system 68. The system allows two way communication between the transmit unit 20 and the receive unit 22 by working identically in both directions. In one direction, the transmit unit 20 sends communication data via the input signal 26 to the direct interface system 68 which processes and routes the data via the output signal 28 to a receive unit 22. In the other direction, the receive unit 22 sends communication data via the output signal 28 to the direct interface system 68 which processes and routes the data via the input signal 26 to a transmit unit 20. The transmit unit 20 and receive unit 22 are either mobile terminals or non-mobile terminals.

Figure 8:
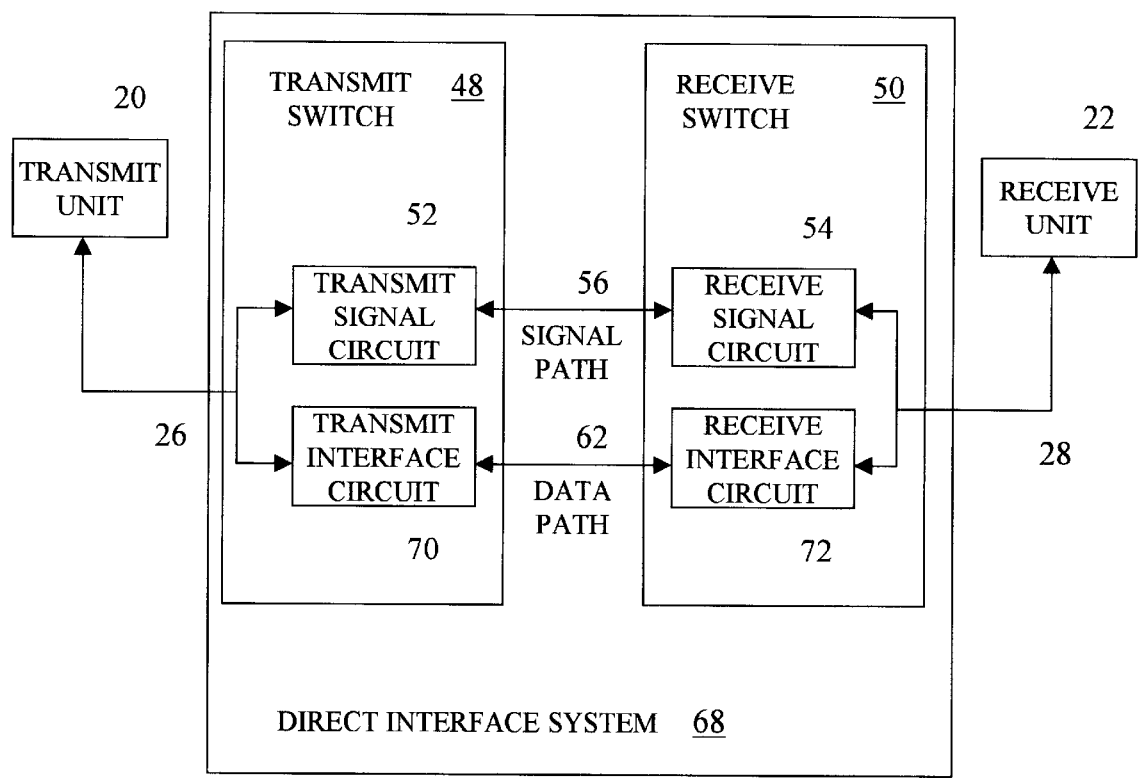
FIG. 8 is another functional block diagram showing the preferred form of the direct interface system functional block in FIG. 3.

In FIG. 8, the direct interface system 68 is shown in greater detail. Similar to the existing non-direct interface system 24, the direct interface system 68 contains numerous telecommunication switches corresponding to the different base stations for the different cells in the telecommunication system. If the mobile terminals are in the same cell the transmit switch 48 and the receive switch 50 are the same switch corresponding to the base station of given cell.

As an example, the direct interface system 68 is shown to have at least two switches because the two mobile terminals corresponding to the transmit unit 20, in cell 34 in FIG. 3, and the receive unit 22, in cell 36 in FIG. 3, are in different cells. The first switch, the transmit switch 48, corresponds to the base station 40 in FIG. 3 and the second switch, the receive switch 50, corresponds to the base station 42 in FIG. 3.

The transmit switch 48 contains a transmit signal circuit 52 and a transmit interface circuit 70. The receive switch 50 contains a receive signal circuit 54 and receive interface circuit 72. The transmit unit 20 communicates with the receive unit 22 through the combination of the transmit switch 48 and receive switch 50.

The transmit unit 20 attempts to communicate with receive unit 22 by transmitting the input signal 26 to the transmit switch 48. The input signal 26 is of a given RF modulation encoded speech-frame type. When the input signal 26 is received by the transmit switch 48, the transmit switch 48 determines the encoded speech-frame type of the input signal 26 and sets the transmit interface circuit 70 to accept the encoded speech-frame type of the input signal 26. The transmit switch 48, with the transmit signal circuit 52, also determines from the input data 26 the identification request from the transmit unit 20.

The transmit signal circuit 52 sends an identification request via the signal path 56 to the receive signal circuit 54 in the receive switch 50. When the receive signal circuit 54 receives the identification request, the receive signal circuit 54 attempts to establish a connection with the receive unit 22. If the receive unit 22 fails to respond, the receive signal circuit 54 returns a unit not responding message via the signal path 56 to the transmit signal circuit 52 which forwards the message to the transmit unit 20 and stops communication.

If the receive unit 22 does respond, the receive signal circuit 54 determines the receive unit's 22 encoded speech-frame type, sets the receive interface circuit 72 to a pass through mode, and sends a message, via the signal path 56, to the transmit signal switch 52 containing the receive unit's 22 encoded speech-frame type. The transmit switch 48 then sets the transmit interface circuit 70 to a mode that converts the transmit unit's 20 encoded speech-frame type directly to the receive unit's 22 encoded speech-frame type without going through an intermediate conversion to PCM modulation.

After the receive signal circuit 54 is set to the pass through mode, it sends a message, via the signal path 56, to the transmit signal circuit 52 to start communication. The transmit interface circuit 70 then converts the transmit unit's 20 encoded speech-frame input signal 26 to the corresponding receive unit's 22 encoded speech-frame type and sends the data, via the data path 62, to the receive interface circuit 72 which is set to the pass through mode. The receive switch 50 then transmits the output signal 28 to the receive unit 22.

Communication in the opposite direction from the receive unit 22 to the transmit unit 20 is identical because the direct interface system 68 is a complete two way communication system. The transmit switch 48 and the receive switch 50 operate in the same way.

Figure 9:
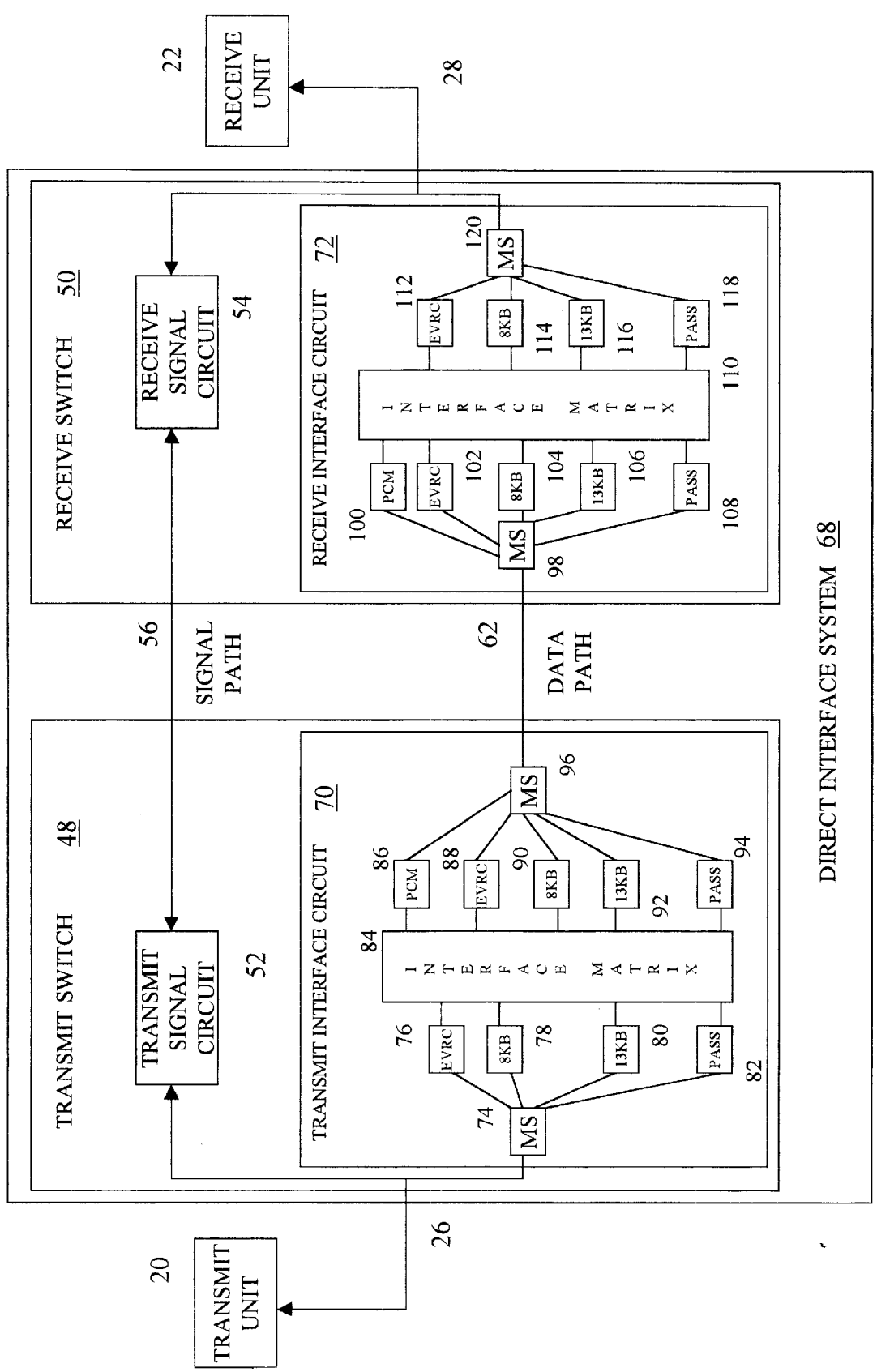
FIG. 9 is detailed functional block diagram showing the preferred form of the transmit and receive interface circuit functional blocks in FIG. 4.

Referring to FIG. 9, the transmit interface circuit 70 and receive interface circuit 72 of FIG. 8 are shown in greater detail. The transmit interface circuit 70 contains an interface matrix 84 which cross-converts a set of input encoded speech-frame types 76, 78 and 80 to a corresponding set of output encoded speech-frame types 86, 88, 90 and 92 if the input and output encodings are different. If the input and output encodings are similar, the transmit interface circuit 70 is set to a pass through mode and cross-connects, with no conversion, the input and output signal via pass connections 82 and 94.

Similarly, the receive interface circuit 72 also contains an interface matrix 110 which cross-converts a set of input encoded speech-frame types 112, 114 and 116 to a corresponding set of output encoded speech-frame types 100, 102, 104 and 106 if the input and output encodings are different. If the input and output encodings are similar, the transmit interface circuit 72 is set to the pass through mode and cross-connects the input and output signal via pass connections 108 and 118.

The encoded speech-frame types are numerous because the invention works equally well with time division multiple access (TDMA), code division multiple access (CDMA) or other similar digital encoding schemes. For example purposes a CDMA type system is shown, the encoding speech frame types have been chosen to be either enhanced variable rate coding (EVRC) (76, 88, 102 and 112), eight-kilobit code excited linear prediction (8 kb) (78, 90, 104 and 114), thirteen kilobit code excited linear prediction (13 kb) (80, 92, 106 and 116) and PCM (86 and 100). Note that other combinations and types of encoded speech-frames could be used without modifying the invention. The choice for the example is based on the encoded speech-frame types used in existing telecommunication systems in the United States.

When the transmit unit 20 attempts to communicate with the receive unit 22 by transmitting the input signal 26 to the transmit switch 48. The transmit switch 48 determines the encoded speech-frame type of the input signal 26 with a matrix selector (MS) circuit 74. After determining the encoded speech-frame type of the input signal 26, the MS circuit 74 sets the transmit interface circuit 70 to accept the encoded speech-frame type of the input signal 26. The MS circuit 74 sets the interface matrix 84 to accept one of the encoded speech-frame input types 76, 78 and 80 that corresponds to the encoded speech-frame type of the input signal 26.

The transmit switch 48, with the transmit signal circuit 52, then determines from the input data 26 the identification request from the transmit unit 20 and transmits it to the receive signal circuit 54 via the signal path 56. When the receive signal circuit 54 receives the communication request, the receive signal circuit 54 attempts to establish a connection with the receive unit 22. If the receive unit 22 does respond, the receive signal circuit 54 determines the receive unit's 22 encoded speech-frame type, sets the receive interface circuit 72 to the pass through mode and sends a message, via the signal path 56, to the transmit signal switch 52 containing the receive unit's 22 encoded speech-frame type.

The receive signal circuit 54 sends the receive unit's 22 encoded speech-frame type to the transmit signal circuit 52 via the signal path 56. When the transmit signal circuit 52 receives the receive unit's 22 encoded speech-frame type, it passes the information to the transmit interface circuit 70. The second MS circuit 96 then sets the interface matrix 84 to select one of the output encoded speech-frame types 86, 88, 90 and 92 that corresponds to the receive unit's 22 encoded speech-frame type.

If the transmit unit's 20 encoded speech-frame type is different than the receive unit's 22 encoded speech-frame, the interface matrix 84 then cross-converts the transmit unit's 20 encoded speech-frame type directly to the receive unit's 22 encoded speech-frame type without going through an intermediate conversion to PCM. If the transmit unit's 20 encoded speech-frame type is similar to the receive unit's 22 encoded speech-frame, the interface matrix 84 set itself in the pass through mode and cross-connects the transmit unit's 20 encoded speech-frame type directly to the receive unit's 22 encoded speech-frame type any processing.

The transmit interface circuit 70 then converts the transmit unit's 20 encoded speech-frame type input signal 26 to the corresponding receive unit's 22 encoded speech-frame type and sends the data, via the data path 62, to the receive interface circuit 72 which is set to the pass through mode. The receive switch 50 then transmits the output signal 28 to the receive unit 22.

Communication in the opposite direction from the receive unit 22 to the transmit unit 20 is identical because the direct interface system 68 is a complete two way communication system. The transmit switch 48 and the receive switch 50 operate in the same way.

In FIG. 10, a logic flow chart shows the preferred process steps preformed by the system of FIG. 7. In process starts at 122. In step 124, the transmit unit 20 of FIG. 9 transmits an input data signal 26. The transmit switch 48 of FIG. 9 negotiates the encoding rate of the input signal 26 of FIG. 9 in step 126. In step 128, the transmit switch 48 of FIG. 9 transmits the transmit unit's encoding speech-frame type via the signal path 56 of FIG. 9 to the receive switch 54 of FIG. 9.

The process then determines if the receive unit 22 of FIG. 9 is a mobile unit in decision step 130. If the receive unit 22 of FIG. 9 is not a mobile unit the process recognizes that it will be communicating with a land-line telephone and sets the receive interface circuit 50 of FIG. 9 to the pass through mode in step 132 and continues to step 134. In step 134, the transmit interface circuit 70 cross-converts the transmit unit's 20 encoded speech-frame type to 64 kb PCM. In step 136, the transmit switch 48 sends the information to the private switched telephone network 30 of FIG. 2 by receive switch 50.

If the receive unit 22 is a mobile unit in decision step 130, the process instead continues to decision step 138. In decision step 138, the process determines if the receive unit 22 is avaliable. If the answer is no, the process continues to decision step 140. In decision step 140, the process checks to see if the receive unit 22 has call features such as voice mail. If no, the process ends in step 142. If yes, the process recognizes that it will be communicating with a land-line call center and sets the receive interface circuit 50 of FIG. 9 to the pass through mode in step 132 and continues to step 134. In step 134, the transmit interface circuit 70 cross-converts the transmit unit's 20 encoded speech-frame type to 64 kb PCM. In step 136, the transmit switch 48 sends the call to voice messaging system.

If the answer to decision step 138 is yes, the process continues instead to step 144. In step 144, the receive switch 50 of FIG. 9 determines the receive unit's 22 of FIG. 9 encoded speech-frame type. Then the receive switch 50 of FIG. 9, in step 146, transmits the receive unit's 22 of FIG. 9 encoded speech-frame type over the signal path 56 of FIG. 9 to the transmit switch 48 of FIG. 9 and the process continues to decision step 148.

In decision step 148, the transmit switch 48 determines whether the transmit unit's 20 of FIG. 9 encoded speech-frame type is similar to the receive unit's 22 of FIG. 9 encoded speech-frame type. If yes, the process continues to step 150. In step 150, the transmit switch 48 of FIG. 9 sets the interface matrix 84 of FIG. 9 to cross-connect from the transmit unit's 20 of FIG. 9 encoded speech-frame type to the receive unit's 22 of FIG. 9 encoded speech frame type and the process continues to step 154.

If the answer to decision step 148 is no, the process instead continues to step 152. In step 152, the transmit switch 48 of FIG. 9 sets the interface matrix 84 of FIG. 9 to cross-convert from the transmit unit's 20 of FIG. 9 encoded speech-frame type to the receive unit's 22 of FIG. 9 encoded speech frame type and the process continues to step 154.

In step 154, the transmit switch 48 of FIG. 9 transmits the data to the receive switch 50 of FIG. 9 via the data path 26 of FIG. 9 and the process continues to step 156. In step 156, the receive switch 50 of FIG. 9 transmits the data to the receive unit 22 of FIG. 9. Once the process has finished sending the data in step 156, the process ends in step 158.

Please note that while the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not, restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention and are thus within its spirit and scope: The scope of the invention is indicated by the attached claims.

What is claimed is:

1. A mobile telephonic communication system, comprising:
   a transmitting unit for transmitting an input signal corresponding to an input modulation type from a group of modulation types including time division multiple access and code division multiple access;
   a receiving unit for receiving an output signal corresponding to an output modulation type, and
   a direct interface system directly interfacing the input signal to the output signal wherein the direct interface system further includes;
   a transmit interface circuit directly interfacing the input signal to a data path signal; and a receive interface circuit directly interfacing the data path signal to the output signal wherein the transmit interface circuit further includes:
- a plurality of input modulation types, one of which represents the modulation type corresponding to the input signal;
- a plurality of output modulation types, one of which represents the modulation type corresponding to a data path signal, and
- an interface matrix which directly interfaces the modulation type corresponding to the data path signal to the modulation type corresponding to the input signal.

2. The system as recited in claim 1, wherein the interface matrix directly interfaces the input signal to the data path signal with no more than one modulation conversion.

3. The system as recited in claim 2, wherein the mobile telephonic communication system is a cellular communication system.

4. The system as recited in claim 2, wherein the modulation types are code division multiple access.

5. The system as recited in claim 2, wherein the modulation types are time division multiple access.

6. The system as recited in claim 2, wherein the modulation types are global standard for mobile communications.

7. The system as recited in claim 1, wherein the interface matrix directly interfaces a radio frequency input signal to a radio frequency data path signal.

8. The system as recited in claim 7, wherein the mobile telephonic communication system is a cellular communication system.

9. The system as recited in claim 7, wherein the modulation types are code division multiple access.

10. The system as recited in claim 7, wherein the modulation types are time division multiple access.

11. A mobile telephonic communication system, comprising:
- a transmitting unit for transmitting an input signal corresponding to an input modulation type of modulation types including time division multiple access and code division multiple access;
- a receiving unit for receiving an output signal corresponding to an output modulation type, and
- a direct interface system directly interfacing the input signal to the output signal wherein the direct interface system further includes;
- a transmit interface circuit directly interfacing the input signal to a data path signal; and
- a receive interface circuit directly interfacing the data path signal to the output signal wherein the receive interface circuit further includes;
- a plurality of input modulation types, one of which represents the modulation type corresponding to the output signal;
- a plurality of output modulation types, one of which represents the modulation type corresponding a data path signal; and
- an interface matrix which directly interfaces the modulation type corresponding to the data path signal to the modulation type corresponding to the output signal.

12. The system as recited in claim 11, wherein the interface matrix directly interfaces the input signal to the data path signal with no more than one modulation conversion.

13. The system as recited in claim 12, wherein the mobile telephonic communication system is a cellular communication system.

14. The system as recited in claim 12, wherein the modulation types are code division multiple access.

15. The system as recited in claim 12, wherein the modulation types are time division multiple access.

16. The system as recited in claim 11, wherein the interface matrix directly interfaces a radio frequency input signal to a radio frequency data path signal.

17. The system as recited in claim 16, wherein the mobile telephonic communication system is a cellular communication system.

18. The system as recited in claim 16, wherein the modulation types are code division multiple access.

19. The system as recited in claim 16, wherein the modulation types are time division multiple access.

20. The system as recited in claim 1, wherein the transmit interface circuit further includes:
- a plurality of transmit input modulation types, one of which represents the modulation type corresponding to the input signal;
- a plurality of transmit output modulation types, one of which represents the modulation type corresponding a data path signal;
- a transmit interface matrix which directly interfaces the modulation type corresponding to the data path signal to the modulation type corresponding to the input signal;
- a plurality of receiving input modulation types, one of which represents the modulation type corresponding to the output signal;
- a plurality of receiving output modulation types, one of which represents the modulation type corresponding a data path signal; and
- a receiving interface matrix which directly interfaces the modulation type corresponding to the data path signal to the modulation type corresponding to the output signal.

21. The system as recited in claim 20, wherein the transmit interface matrix directly interfaces the input signal to the data path signal with no more than one modulation conversion and the receive interface matrix directly interfaces the data path signal to the output signal with no modulation conversion.

22. The system as recited in claim 21, wherein the mobile telephonic communication system is a cellular communication system.

23. The system as recited in claim 21, wherein the modulation types are code division multiple access.

24. The system as recited in claim 21, wherein the modulation types are time division multiple access.

25. The system as recited in claim 20, wherein the transmit interface matrix directly interfaces a radio frequency input signal to a radio frequency data path signal with no more than one modulation conversion and the receive interface matrix directly interfaces a radio frequency data path signal to a radio frequency output signal with no modulation conversion.

26. The system as recited in claim 25, wherein the mobile telephonic communication system is a cellular communication system.

27. The system as recited in claim 25, wherein the modulation types are code division multiple access.

28. The system as recited in claim 25, wherein the modulation types are time division multiple access.

29. The system as recited in claim 11, wherein the direct interface system further includes:
- a switch; and an interface circuit directly interfacing the input signal to the output signal within the switch.

30. The system as recited in claim 29, wherein the interface circuit further includes:
   a plurality of input modulation types, one of which represents the modulation type corresponding to the input signal;
   a plurality of output modulation types, one of which represents the modulation type corresponding the output signal; and
   an interface matrix which directly interfaces the modulation type corresponding to the output signal to the modulation type corresponding to the input signal.

31. The system as recited in claim 30, wherein the mobile telephonic communication system is a cellular communication system.

32. The system as recited in claim 30, wherein the modulation types are code division multiple access.

33. The system as recited in claim 30, wherein the modulation types are time division multiple access.

34. The system as recited in claim 30, wherein the interface matrix directly interfaces the input signal to the output signal with no more than one modulation conversion.

35. The system as recited in claim 34, wherein the mobile telephonic communication system is a cellular communication system.

36. The system as recited in claim 34, wherein the modulation types are code division multiple access.

37. The system as recited in claim 34, wherein the modulation types are time division multiple access.

38. The system as recited in claim 30, wherein the interface matrix directly interfaces a radio frequency input signal to a radio frequency output signal.

39. The system as recited in claim 38, wherein the mobile telephonic communication system is a cellular communication system.

40. The system as recited in claim 38, wherein the modulation types are code division multiple access.

41. The system as recited in claim 38, wherein the modulation types are time division multiple access.

42. A system for routing data from a transmit unit to a receive unit, comprising:
   a plurality of input modulation types, one of which represents the modulation type of
   the input signal from the transmit unit;
   the modulation types include time division multiple access and code division multiple access;
   a plurality of output modulation types, one of which represents the modulation type of the data to the receive unit; and
   an interface matrix which selects one output modulation type corresponding to the modulation type of the input signal from the transmit unit;
      wherein the interface matrix directly interfaces the one output modulation type to the modulation type of the input signal with no more than one modulation conversion;
      wherein the input modulation type is global standard for mobile communications and the output modulation type is time division multiple access or code division multiple access.

* * * * *